April 10, 1962 S. S. WULC 3,029,368

MODULAR CIRCUIT ASSEMBLY

Filed Nov. 25, 1959 2 Sheets-Sheet 1

INVENTOR

Stanley S. Wulc

BY Pais Haskell + Levine

ATTORNEYS

April 10, 1962 S. S. WULC 3,029,368

MODULAR CIRCUIT ASSEMBLY

Filed Nov. 25, 1959 2 Sheets-Sheet 2

INVENTOR

Stanley S. Wulc,

BY Paris Haskell & Levine

ATTORNEYS 3,029,368

MODULAR CIRCUIT ASSEMBLY

Stanley S. Wulc, Lafayette Hill, Pa., assignor to Vector Manufacturing Company, a corporation of Pennsylvania Filed Nov. 25, 1959, Ser. No. 855,406
7 Claims. (Cl. 317—101)

This invention relates generally to improvements in housings for electronic circuits and more particularly to modular housings or units provided with mating electrical connectors therebetween and adapted to be compactly nested or stacked together in series arrangement.

This invention is particularly concerned with the packaging or housing of individual electronic circuits, such as amplifiers or oscillators, in such manner that the individual units may be constructed and made available as separate modules or building blocks and later readily assembled in different system arrangements as desired for telemetering or related applications. Each individual housing unit or module contains a separate electrical circuit, such as an amplifier or oscillator, and is constructed to both mechanically and electrically engage a succeeding and preceding module whereby the units may be assembled in a stack or series array without the need for a single chassis or terminal board common to all units as is customary in the many known plug-in types of modular circuit assemblies.

It is accordingly a principal object of the invention to provide a modular circuit housing that is smaller, lighter in weight and otherwise provides a more efficient housing with less unused space than known devices.

A further object is to provide such a unit housing constructed to electrically and mechanically mate with similar units in a compact and light weight arrangement.

Another object is to provide such a unit which completely closes, seals, and protects the electronic circuit components within.

Still another object is to provide such a housing that permits efficient electrical shielding of the circuits one from another.

A still further object is to provide such a housing construction that permits electrical connections to be made directly to and from any one of the units when they are stacked in series arrangement without electrical connection to the other units.

A still further object is to provide such units as may be assembled in either odd or even number stacks without disturbing the electrical interconnections between the units on the separate electrical connections to and from the individual units.

Figure 1:
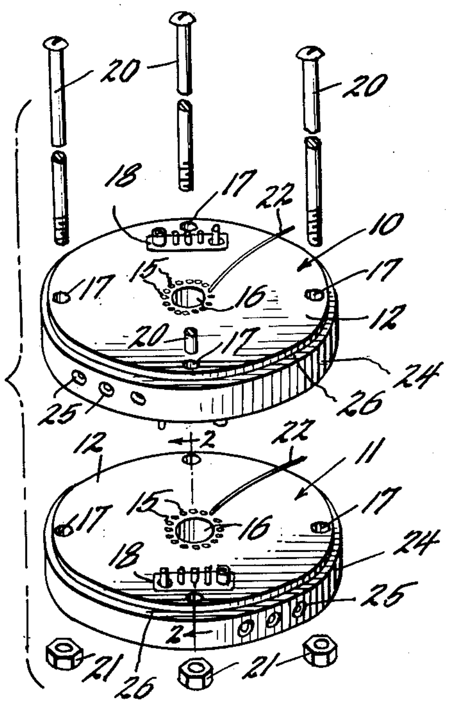
Figure 2:
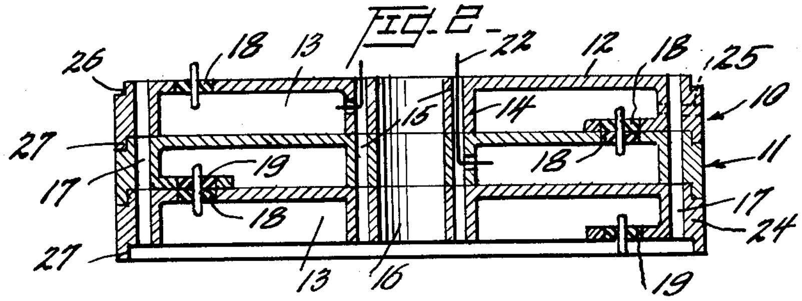
Figure 3:
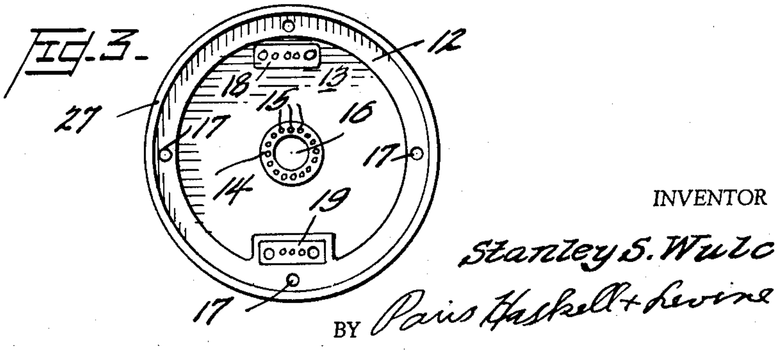
Figure 4:
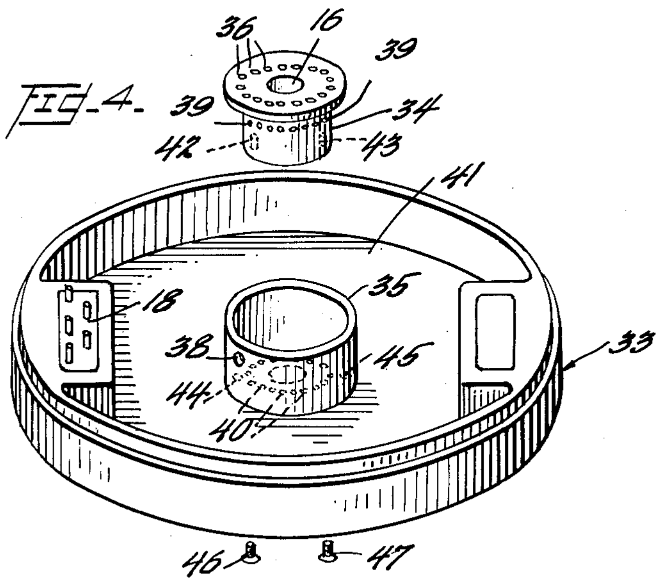
Figures 5, 6:
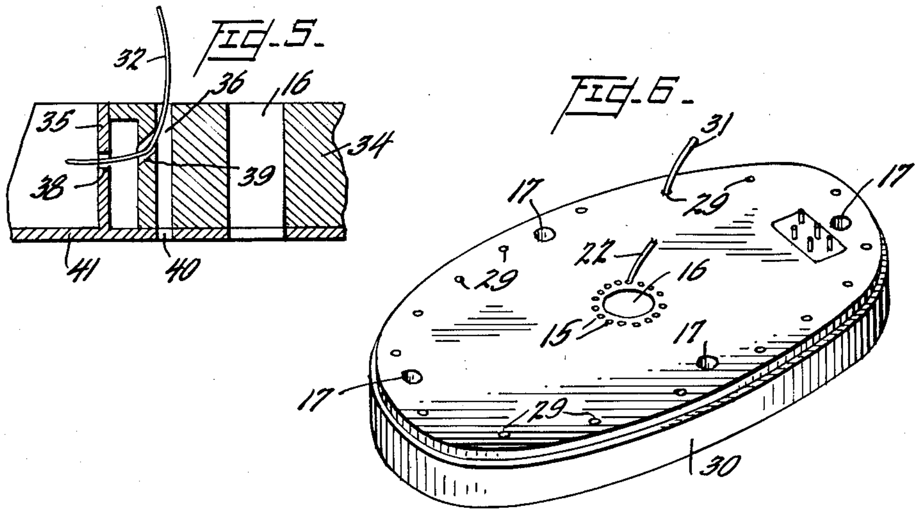

Other objects and many additional advantages will be more readily understood by those skilled in the art after a detailed consideration of the following specification taken with the accompanying drawings wherein:

FIG. 1 is a perspective view illustrating a pair of preferred circuit housings according to the present invention in exploded relation, FIG. 2 is a cross sectional view taken along lines 2—2 of FIG. 1 illustrating three of such unit housings in nested arrangement, FIG. 3 is a plan view illustrating the underside of the housing unit of FIG. 1, FIG. 4 is a perspective view illustrating a second preferred construction of a unit housing with the parts thereof in exploded relation, FIG. 5 is an enlarged sectional view of the hub part of FIG. 4, and FIG. 6 is a plan view illustrating one of the many alternative shapes in which the preferred modular housing may be constructed, and illustrating alternative means for directly connecting input and output leads to the unit.

Referring now to the drawings, there is shown in FIG. 1, a pair of the preferred circuit housings 10 and 11, each generally formed in the shape of a thin circular inverted cup-like member having a flat planar base 12 and a circular outside wall 24 extending downwardly therefrom. As best shown in FIG. 2, the base 12 and outside wall 24 define the upper ceiling boundary and outside of a hollow endless channel 13 within each housing, and a circular hub part 14 within the housing and extending downwardly from a central part of the base 12 forms the inside boundary for the endless channel 13. As thus far described, therefore, the housing is generally in an inverted cup shaped configuration having a central hub part 14, with the surfaces of the outer wall 24 and hub 14 together with the base 12 defining three sides of an endless hollow circular channel 13 within the housing. As shown all of these housing parts may be integrally formed of metal or other relatively rigid and strong electrical conducting material by means of a casting operation, if desired.

The electrical components, which may include miniature electron tubes or transistors interconnected in an oscillator, amplifier or other desired circuit configuration (not shown) are adapted to be contained within the endless channel 13 provided in each unit housing whereby the conducting side walls and base of each housing serve to enclose and protect the circuitry as well as providing electrical shielding and a grounding connection, for the circuit.

As shown in FIG. 2, the housings 10 and 11 are adapted to be stacked one above the other in a series array and in this stacked arrangement, the flat base part 12 of a lower housing unit serves as the cover plate or closure for the channel 13 in the upper housing unit thereby to completely enclose the circuitry housed with the channel 13 when the units are assembled.

To compactly nest the unit housings together and prevent side slippage of one over the other that might damage the electrical pin connector prongs or sockets, the upper rim edging of each housing is notched at 26 and the lower rim edge is provided with an outstanding flanged portion 27 adapted to engage and mate with the notched rim 26. When the housings are stacked one above the other as shown, each housing therefore interlocks with the next in a rugged and shock proof manner to rigidly enclose and protect the circuitry.

If desired or necessary, suitable sealing means such as O ring gaskets or the like may be inserted in the rim joints between the individual housings to provide a moisture or gas proof seal for protecting the circuits. However, for many applications such joint seals sealing the joints will be found unnecessary since it is preferred that a hardenable plastic potting compound be added to the channel 13 to completely embed the circuits within each housing and seal the same from exposure to moisture and corrosion as well as protecting the components and connections against shock and vibration.

Considering the manner of making electrical connections to and from the circuits through the unit housings, each of the housings such as 10 and 11, is provided with a block of miniature prong and socket connectors 18 supported by and extending outwardly from the base 12 near one outside edge of the housing and a second block of connectors 19 extending from the opposite side of the housing near a diametrically opposite edge of the housing. The various connectors of the clock 19 on one side of the housing made complementary to those of 18 on the other side thereof whereby when the unit housings are assembled, the connectors of block 19 mate with connectors of 18 to electrically interconnect the adjoining housings as best shown in FIG. 2. The function provided by these blocks of connectors is to transmit power, biasing signals, grounding or other energization that is common to all of the circuits in the multicircuit system. Specifically, one of the connectors of block 19 in the lowermost or uppermost housing of the assembly may be energized by outside source of D.-C. voltage to supply the B plus voltage for energizing each of the circuits. This voltage energizes the circuit in the first housing where it is applied and is also transmitted to a connector of block 18 in the same housing for transmitting this voltage to energize a mating connector in the block 19 of the next unit housing. In this manner, the B plus voltage is applied in a generally zig-zag fashion to all of the stacked housings through the miniature pin connectors. In a similar manner, other signals and voltages common to all of the circuits may be applied from housing to housing through the pin connectors and require a total of only a few pin connectors in each block. Similarly if the input signal is applied to all of the circuits in common or the output signal from the various circuits is taken from a common line, a single pin in connector block 18 and block 19 of each housing could be assigned for either the common input signal and perhaps one additional pin in each block for the common output signal with equal facility. However, if each of the unit circuits within the different housings requires a different input and output signal, this, of course, requires an unusually large number of connectors since the input and output signals for the tenth housing, for example, would have to pass through the first nine unit housings before reaching the tenth unit. Consequently in such arrangements, each of the unit housings would be required to have in each connector block a number of pins or sockets equal to the number of stacked housing units for the sole purpose of applying separate input signals to the units. Similarly if separate output signals for each housing were to be taken, the total number of connectors would be substantially doubled making this arrangement rather impractical and expensive where a large number of stacked unit housings are employed.

To eliminate this difficulty while providing means for enabling separate input or output signals to be conveyed to the individual unit housings, the inner hub part 14 of each housing is provided with a series of separate small openings 15 extending transversely through the unit housings to receive separate electrical leads 22 originating from within each of the housings.

As shown in FIGS. 1 and 2, these separated openings 15 may be spaced uniformly through the circular hub part 14 and since each opening 15 need accommodate only a single very thin electrical lead, a relatively large number of such openings 15 may be provided. The openings 15 in each unit housing are preferably equally spaced apart and in a given fixed spatial relationship with the electrical connectors 18 and 19 whereby when the unit housings are assembled as shown in FIG. 2, the openings 15 through each housing are in alignment with those extending through the other housings thereby to provide a series of centrally arranged open passages extending transversely along the length of the stacked housings, as shown. In each unit housing, there is provided at least one port 28 leading from the hollow channel 13 of the housing to a different one of the transverse openings 15 whereby an electrical lead 22 originating from within the channel 13 may be threaded through the port 28 and upwardly through the selected hub opening 15 and thence threaded through the aligned openings 15 in each of the stacked housings to be ultimately directed outside the assembled units.

Since each of the openings 15 is separated from the other openings by the conducting material of the hub part 14 it is evident that this construction electrically shields each lead 22 from the others. Consequently by means of these separate openings 15, individual electrical leads 22 may be directed to each of the unit housings in the assembled stack to supply independent input or output signals to the various circuits as desired while electrically shielding each of the leads from the various circuits as it passes through the stacked units.

In a similar manner if the circuitry requires that both separate input and output leads be conveyed to each of the stacked units, a second series of openings may be provided through the hub part or alternatively through the outer wall part 30 as shown at 29 in FIG. 6. In this latter arrangement the output lead 31 originating from the circuit within the housing is threaded through an inner port, such as 28 in FIG. 2, and upwardly through a given opening 29 in the housing and thence through aligned openings in the succeeding housings to ultimately pass outside the stacked assembly. In a manner indicated above, each of the unit housings is assigned a different one of the output lead openings 29 for its output lead 31 and a different one of the input lead openings 15 for its input lead whereby each of both said input and output lead openings 29 and 15 will receive only one lead to provide the electrical shielding desired.

In the event that the circuit does not require electrical shielding between the separate leads, the input and/or output leads from all of the unit housings may be threaded through a single central opening through the housings such as 16 in FIGS. 2 and 6, and the provision of separate openings such as 15 and 29 in the unit housings would be unnecessary. However in most applications electrical shielding is required and the primary purpose of providing the central opening 16 through the housings is to enable the assembled housings to be mounted and attached to a vehicle or other structure, as desired. This may be accomplished as in now believed evident to those skilled in the art by passing a shaft (not shown) through the central opening 16 extending through all of the stacked housings and fastening either or both ends of the shaft to a supporting structure. Other known supporting and fastening means may, of course, be employed as desired.

As further noted in FIG. 6, the outer configuration of the housing may, of course, be formed as an ellipse or in any other shape desired compatibly with the space and size required by the supporting body in which the assembled circuitry is to be housed.

FIGS. 4 and 5 show details of an alternative preferred unit housing 33 of greater versatility permitting both odd or even numbers of such modules to be assembled or removed from a given stack without disturbing the arrangement or orientation of the separate input or output leads. For an understanding of the details of the assembly and the arrangement of the separate leads when certain of the unit housings are removed from a stack, reference is again made to FIG. 2. In FIG. 2 it is observed that the upper and lower unit housings in the stack are oriented with the upper electrical connectors 18 at the left and the lower connectors 19 at the right but the module 11 positioned in between the two is rotated by 180° and its upper block of connectors 18 is at the right and its lower block 19 is at the left thereby to engage and mate with the connectors of both the upper and lower unit housings. Assuming that after assembly it is desired to remove the middle unit housing 11 from the stack the various separate electrical leads 28 are first unthreaded from the openings 15 and the middle housing unit 11 is then removed. Since all of the units are provided with mating electrical connectors, the uppermost housing unit 10 may then be plugged into the lowermost unit. However in order to do so, it must first be rotated by 180° to bring its lowermost block of connectors 19 to the left to mate with the upper block of connectors 18 of the bottom housing unit. This rotation also displaces the position of the opening 15 carrying the separate electrical lead 22 by 180° and may bring this opening and lead into alignment with an opening 15 on a lower housing that already contains an electrical lead. Consequently although the unit housings of FIGS. 1 and 2 are each interchangeable with respect to their electrical pin and socket connectors, the stacking of the units in certain odd number arrangements may bring the separate input or output lead openings into conflict resulting in more than one electrical lead being positioned for threading through a single aperature 15.

To eliminate this possibility, the preferred alternative unit housing structure of FIGS. 4 and 5 provides a detachable hub part 34 which may be removed from a collar 35 that is centrally disposed in the housing 33. The detachable hub part 34 contains the plurality of separate openings 36 therein each to receive a different one of the separate electrical leads 22 originating from the various units.

In each unit, the electrical lead 22 is threaded through a port 38 in the collar 35 and is thence threaded through a second port 39 communicating with one of the transverse openings through the hub part 34, as best shown in FIG. 5. All of the openings 36 in through the detachable hub 34 are aligned with similarly arranged openings 40 through the base 41 of the unit housing.

To retain the detachable hub 34 within its collar 35, the hub 34 is provided with threaded openings 42 and 43 through its base portion and similarly aligned openings 44 and 45 are provided through the base of 41 of the unit housing to enable machine screws 46 and 47 to fasten the hub 34 to the housing. The threaded openings 42 and 43 in the hub member 34 and the openings 44 and 45 in the housing are so arranged that the hub 34 may be removed and rotated by 180° and then reconnected to the housing by the screws 46 and 47. Thus any odd or even number of such unit housings may be stacked together as desired or removed from a stacked assembly without disturbing the orientation of the separate input or output leads since the removable hub portion 34 may be oppositely rotated 180° if necessary to restore the lead openings 36 to their original alignment despite rotation of the unit housing.

In a similar manner a second removable part may be provided for the separate output leads rather than the fixed arrangement as shown in FIG. 6. An alternative arrangement is to provide a pair of concentrically disposed series of openings in the removable hub 34 of FIG. 4, with the second series of openings serving to accommodate the separate output leads. Other arrangements will, of course, be apparent to those skilled in the art in the like of the above.

For fastening the units together in the stacked assembly, additional aligned openings may be provided through each of the housings, such as the openings 17 shown in FIG. 1, permitting elongated bolts 20 to pass through the stack of housings and together with the nuts 21 serve to rigidly retain the stack of housings together. As generally indicated above, the central opening 16 through each of the housings may receive an elongated shaft for supporting and fastened the assembled units within a vehicle or other structure.

As generally discussed throughout this specification many of the features described may be readily varied in shape, size, and arrangement without departing from the spirit and scope of the invention. For example the individual housings may be constructed in circular, elliptical, oblong, or rectangular form as desired to meet the needs of the supporting structure or vehicle. The endless passage 13 for housing the electronic components may likewise be varied to assume a circular oblong, or rectangular configuration. If the circuitry within the housing is of the type requiring adjustment of the contained components, suitable openings, such as those 25 in FIG. 1 may be provided to permit insertion of a screw driver or other adjusting tool. Similarly a tuning arm or other means connected with a component inside the housing may project outwardly from the openings 25 for accessibility outside the housing. Since these and many other changes will be apparent to those skilled in the art after a detailed consideration of the preferred embodiments described above, this invention is to be considered as being limited only according to the following claims.

What is claimed is:

1. A modular circuit assembly comprising:
a plurality of miniature circuit housing modules interchangeably mated with one another mechanically in a self-supporting stacked serial array without the need for a supporting rack or panel board,
each circuit housing containing the electrical components of an independently functioning electrical circuit such as an amplifier, oscillator, or transmitter and with the assembled modules providing a substantially complete radio telemetering transmission system,
the circuit in each of the modules having a separate and independent input terminal, and the input terminals of the different modules each being independently energizable from a different one of a plurality of outside signal sources,
a plurality of electrical input signal conductor means each providing electrical connection between the electrical input terminal of a respective module and its related one of the different outside signal sources,
the input signal conductor means for each module making electrical connection transversely through the interior of each one of the housing modules preceding that module, whereby the different input signals are each directed to a different one of the modules and pass through all preceding modules in the array in succession,
electrical shielding means in each module for electrically isolating the electrical conductor means for succeeding modules from the circuitry within that module,
said electrical conductor means being disposed to make electrical connection through all said preceding modules in a direction substantially transversely through the stacked array and providing accessibility to all of the electrical input signal conductor means at one end of the stacked array,
and each of the housing modules disposed within the stack and between the two end modules being provided with additional conductor means detachably engaged with preceding and succeeding modules for conveying electrical power energization to the circuits of all of said modules in common, said additional means comprising mating electrical connectors.

2. In the circuit assembly of claim 1, each of the housing modules being provided with complementary flanged portions to interchangeably interengage with preceding and succeeding housings in self-supporting relationship.

3. In the circuit assembly of claim 1, each of the housings being provided with a transverse wall having a plurality of separate openings formed therein,
and said electrical conductor means for each housing comprising an elongated electrical lead connected at one end to the input terminal of that housing and serially passing through a different one of said openings in each of the preceding housing modules.

4. In the circuit assembly of claim 1, each of the housing modules comprising a base and an outer wall extending upwardly from the outer peripheral region of the base with the dimension across the base being much greater than the height of the wall to define a shallow wafer housing configuration to contain the electrical components,
and a potting compound filling the housing and defining an ouster surface of the module.

5. In the circuit assembly of claim 1, detachable fastening means for retaining the modules together in the assembled array,
said fastening means being comprised of an opening provided through all of the modules with said openings being aligned in the stacked array, and an elongated fastener member passing through the aligned openings in the stacked array thereby to lock the modules together.

6. In the circuit assembly of claim 1, each of the housings being provided with a plurality of openings formed therein with the number of such openings being at least as great as the maximum number of modules in the array, and said electrical conductor means for each module comprising an elongated electrical lead connected at one end to the input terminus of that housing and the other end thereof passing serially through a different one of said openings in each of the preceding housing modules.

7. A modular circuit assembly comprising:

a plurality of wafer shaped circuit housing modules of mating configuration interchangeably assembled in a self-supporting stacked serial array wherein a variable number of such modules may be assembled, each housing module containing the electrical components of a separate independently functioning miniaturized electrical circuit, such as an amplifier, oscillator, or transmitter and with the assembled modules providing a substantially complete radio telemetering transmission system, electrical conductor means for making separate and independent electrical signal connections to each of the modules in the stacked array, with the electrical conductor means for each module being directed serially through all of the preceding modules in the stacked array, electrical shielding means for each module for shielding the electrical conductors leading to other modules from the circuit within that module, additional conductor means for commonly energizing the circuits in all of the housing modules to supply electrical power to all circuits, said additional conductor means comprising a pair of electrical connectors for each of the modules within the array and between the two end modules, each connector of the pair being disposed on an opposite side of the module with the connector on one side interengaging with the mating connector of the preceding module in the array and the connector on the other side interengaging with the mating connector of the succeeding module in the array, each of the modular housings having a substantially flat base and an outer wall extending upwardly from the outer peripheral region of the base with the dimension across the base being much greater than the height of the wall of define a shallow housing configuration to contain said miniature electrical components, detachable fastening means passing through aligned openings provided in the assembled modules for retaining the housings together in the array in which they are assembled, said electrical conductor means for making independent electrical connections to each of the modules making electrical connection transversely through the the interior of each of the modules preceding that module and providing accessibility to all of said electrical conductor means at one end of the stacked array.

References Cited in the file of this patent

UNITED STATES PATENTS

| | | |
|---|---|---|
| 2,488,763 | Charlin | Nov. 22, 1949 |
| 2,718,623 | Yoder | Sept. 20, 1955 |
| 2,760,127 | Duncan | Aug. 21, 1956 |
| 2,783,416 | Butler | Feb. 26, 1957 |
| 2,858,491 | Carter | Oct. 28, 1958 |
| 2,896,033 | Hartz | July 21, 1959 |
| 2,898,522 | Handen | Aug. 4, 1959 |
| 2,912,625 | Benson | Nov. 10, 1959 |